(12) United States Patent
Asher et al.

(10) Patent No.: US 11,516,207 B2
(45) Date of Patent: Nov. 29, 2022

(54) METHOD FOR PROVISION OF IDENTITY VERIFICATION CERTIFICATE

(71) Applicant: JPMorgan Chase Bank, N.A., New York, NY (US)

(72) Inventors: Adrian Asher, Jersey City, NJ (US); Kabron Austin Kline, Grove City, OH (US); Tamila Fathi, Plano, TX (US); Jared Dean Mitten, Chillicothe, OH (US); Carl Dashfield, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 106 days.

(21) Appl. No.: 16/890,584

(22) Filed: Jun. 2, 2020

(65) Prior Publication Data

US 2021/0377257 A1 Dec. 2, 2021

(51) Int. Cl.
*H04L 9/40* (2022.01)
*H04L 9/32* (2006.01)
*G06F 21/44* (2013.01)

(52) U.S. Cl.
CPC .......... *H04L 63/0823* (2013.01); *G06F 21/44* (2013.01); *H04L 9/3268* (2013.01)

(58) Field of Classification Search
CPC .... H04L 63/0823; H04L 9/3268; G06F 21/44
See application file for complete search history.

(56) References Cited

U.S. PATENT DOCUMENTS

| | | | |
|---|---|---|---|
| 2008/0256616 A1* | 10/2008 | Guarraci | H04L 9/3234 726/9 |
| 2011/0213965 A1* | 9/2011 | Fu | H04L 63/0823 709/248 |
| 2011/0213966 A1* | 9/2011 | Fu | H04L 9/3268 713/158 |
| 2018/0007059 A1* | 1/2018 | Innes | G06F 21/6218 |
| 2018/0091497 A1* | 3/2018 | Nadler | G06F 21/10 |
| 2019/0081798 A1* | 3/2019 | Fu | G06F 21/60 |
| 2019/0356482 A1* | 11/2019 | Nix | H04L 9/14 |
| 2020/0034518 A1* | 1/2020 | Mezzalira | G06F 21/44 |
| 2020/0059881 A1* | 2/2020 | Gupta | H04L 63/0807 |

* cited by examiner

*Primary Examiner* — Kristine L Kincaid
*Assistant Examiner* — Zoha Piyadehghibi Tafaghodi
(74) *Attorney, Agent, or Firm* — Greenblum & Bernstein, P.L.C.

(57) ABSTRACT

A method for facilitating a provision of a certificate that securely verifies an identification of an application is provided. The method includes: validating a bootstrap identity that identifies the application at a time of invocation; generating a first token that is signed with a first private key and transmitting the signed first token to the application; receiving, from an external server, a request for a public key to be used for verifying the first private key; and transmitting the requested public key to the external server in order to prompt the external server to provide the certificate to the application. When prompted to provide the certificate to the application, the external server generates a second token that is signed with a second private key and transmits the certificate in conjunction with the signed second token to the application. The private keys are never shared with the application.

15 Claims, 6 Drawing Sheets

METHOD FOR PROVISION OF IDENTITY VERIFICATION CERTIFICATE

BACKGROUND

1. Field of the Disclosure

This technology generally relates to methods and systems for provision of a certificate that securely verifies an identification of an application, and more particularly, to methods and systems for providing a certificate that enables an application to obtain access to a protected resource without a need for the application to store a security credential such as a password.

2. Background Information

For many applications, there are security requirements that require the use of a credential that securely verifies the identification of the respective application. When such an application is being run on a platform that is owned or controlled by a particular organizational entity, the entity may provide a credential, such as a shared secret, a password, or an X.509 certificate, to an authorized user of that platform.

When an application is being deployed to cloud platforms, which may be internal or external to the organizational entity, the application may require a credential that is usable on both internal and external platforms, i.e., a platform-independent credential, such as, for example, an Active Directory Federation Services (ADFS) authenticated resource. For this circumstance, the use of a shared secret, a password, or an X.509 certificate may create any of a variety of control and management problems and may therefore be impractical.

Accordingly, there is a need for a method for providing a certificate that securely verifies an identification of an application in order to enable the application to obtain access to a protected resource without a need for the application to store a security credential such as a password.

SUMMARY

The present disclosure, through one or more of its various aspects, embodiments, and/or specific features or sub-components, provides, inter alia, various systems, servers, devices, methods, media, programs, and platforms for providing a certificate that securely verifies an identification of an application in order to enable the application to obtain access to a protected resource without a need for the application to store a security credential such as a password.

According to an aspect of the present disclosure, a method for facilitating a provision of a certificate that securely verifies an identification of an application is provided. The method is implemented by at least one processor. The method includes: receiving, from the application, a request for an identity of a target directory that relates to an external server, the request including a bootstrap identity that identifies the application at a time of invocation; validating the bootstrap identity; generating a first token that is signed with a first private key and transmitting the signed first token to the application; receiving, from the external server after the signed first token has been received by the external server from the application, a request for a public key to be used for verifying the first private key; and transmitting, to the external server, the requested public key in order to prompt the external server to provide the certificate to the application.

When prompted to provide the certificate to the application, the external server may be configured to generate a second token that is signed with a second private key and to transmit the certificate in conjunction with the signed second token to the application.

Each of the first private key and the second private key may never be provided to the application.

At least one from among the signed first token and the signed second token may use a JavaScript Object Notation (JSON) Web Token (JWT) format.

The external server may be an Active Directory Federation Services (ADFS) server.

According to another exemplary embodiment, a method for obtaining a certificate that securely verifies an identification of an application is provided. The method is implemented by at least one processor configured to execute the application. The method includes: transmitting, by the at least one processor to a first server, a request for an identity of a target directory that relates to an second server configured to generate the certificate, the request including a bootstrap identity that identifies the application at a time of invocation; receiving, by the at least one processor from the first server, a first token that is signed with a first private key; transmitting, by the at least one processor to the second server, the signed first token; and receiving the certificate from the second server after the second server has obtained a public key from the first server and used the public key to verify the signed first token.

The receiving of the certificate may include receiving, in conjunction with the certificate, a second token that is generated by the second server and signed with a second private key.

The method may further include: transmitting, by the at least one processor to a third server configured to control access to a resource, a request that relates to the resource, the request including the certificate and the signed second token; and receiving a response to the request from the third server.

The receiving of the response to the request may occur after the third server has obtained the public key from the second server and used the public key to verify the signed second token.

Each of the first private key and the second private key may never be provided to the at least one processor.

At least one from among the signed first token and the signed second token may use a JavaScript Object Notation (JSON) Web Token (JWT) format.

The second server may be an Active Directory Federation Services (ADFS) server.

The third server may include a web application programming interface (API).

According to yet another aspect of the present disclosure, a computing apparatus for facilitating a provision of a certificate that securely verifies an identification of an application is provided. The computing apparatus includes a processor, a memory, and a communication interface coupled to each of the processor and the memory. The processor is configured to: receive, from the application via the communication interface, a request for an identity of a target directory that relates to an external server, the request including a bootstrap identity that identifies the application at a time of invocation; validate the bootstrap identity; generate a first token that is signed with a first private key and transmit the signed first token to the application via the communication interface; receive, from the external server via the communication interface after the signed first token has been received by the external server from the application, a request for a public key to be used for verifying the first private key; and transmit, to the external server via the communication interface, the requested public key in order to prompt the external server to provide the certificate to the application.

When prompted to provide the certificate to the application, the external server may be configured to generate a second token that is signed with a second private key and to transmit the certificate in conjunction with the signed second token to the application.

Each of the first private key and the second private key may never be provided to the application.

At least one from among the signed first token and the signed second token may use a JavaScript Object Notation (JSON) Web Token (JWT) format.

The external server may be an Active Directory Federation Services (ADFS) server.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
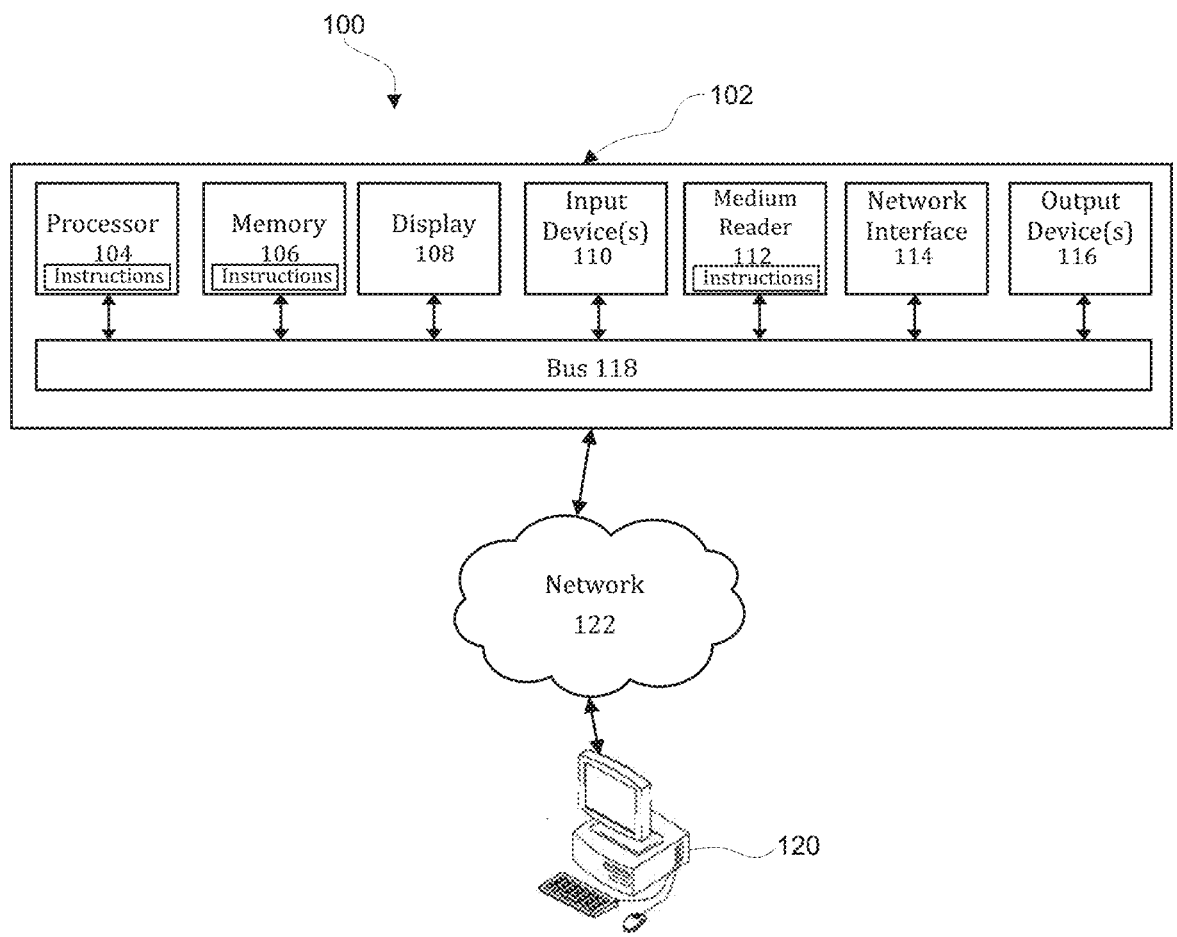
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing a certificate that securely verifies an identification of an application in order to enable the application to obtain access to a protected resource without a need for the application to store a security credential such as a password.

Figure 2:
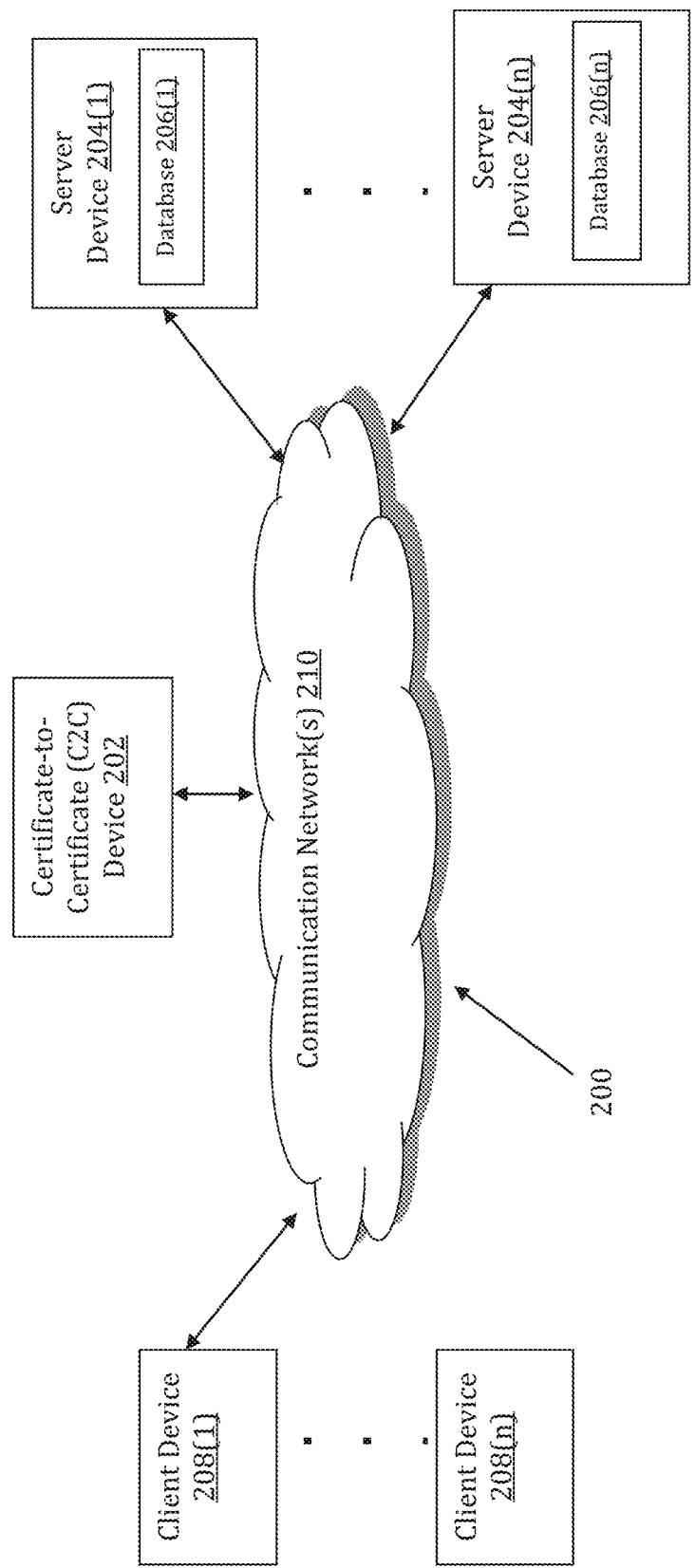
FIG. 2 illustrates an exemplary diagram of a network environment.

Referring to FIG. 2, a schematic of an exemplary network environment 200 for implementing a method for providing a certificate that securely verifies an identification of an application in order to enable the application to obtain access to a protected resource without a need for the application to store a security credential such as a password is illustrated. In an exemplary embodiment, the method is executable on any networked computer platform, such as, for example, a personal computer (PC).

The method for providing a certificate that securely verifies an identification of an application in order to enable the application to obtain access to a protected resource may be implemented by a Certificate-to-Certificate (C2C) device 202. The C2C device 202 may be the same or similar to the computer system 102 as described with respect to FIG. 1. The C2C device 202 may store one or more applications that can include executable instructions that, when executed by the C2C device 202, cause the C2C device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the C2C device 202 itself, may be located in virtual server(s) running in a cloud-based computing environment rather than being tied to one or more specific physical network computing devices. Also, the application(s) may be running in one or more virtual machines (VMs) executing on the C2C device 202. Additionally, in one or more embodiments of this technology, virtual machine(s) running on the C2C device 202 may be managed or supervised by a hypervisor.

In the network environment 200 of FIG. 2, the C2C device 202 is coupled to a plurality of server devices 204(1)-204(n) that hosts a plurality of databases 206(1)-206(n), and also to a plurality of client devices 208(1)-208(n) via communication network(s) 210. A communication interface of the C2C device 202, such as the network interface 114 of the computer system 102 of FIG. 1, operatively couples and communicates between the C2C device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the C2C device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and C2C devices that efficiently implement a method for providing a certificate that securely verifies an identification of an application in order to enable the application to obtain access to a protected resource without a need for the application to store a security credential such as a password.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The C2C device 202 may be a standalone device or integrated with one or more other devices or apparatuses, such as one or more of the server devices 204(1)-204(n), for example. In one particular example, the C2C device 202 may include or be hosted by one of the server devices 204(1)-204(n), and other arrangements are also possible. Moreover, one or more of the devices of the C2C device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the C2C device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store security credential data, including certificate data, password data, token data, and other data regarding resource access authorization, and application-specific data that relates to various applications that require security credentials for accessing resources.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the C2C device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the C2C device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the C2C device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the C2C device 202, the server devices 204(1)-204(n), or the client devices 208(1)-208(n), for example, may be configured to operate as virtual instances on the same physical machine. In other words, one or more of the C2C device 202, the server devices 204(1)-204(n), or the client devices 208(1)-208(n) may operate on the same physical device rather than as separate devices communicating through communication network(s) 210. Additionally, there may be more or fewer C2C devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
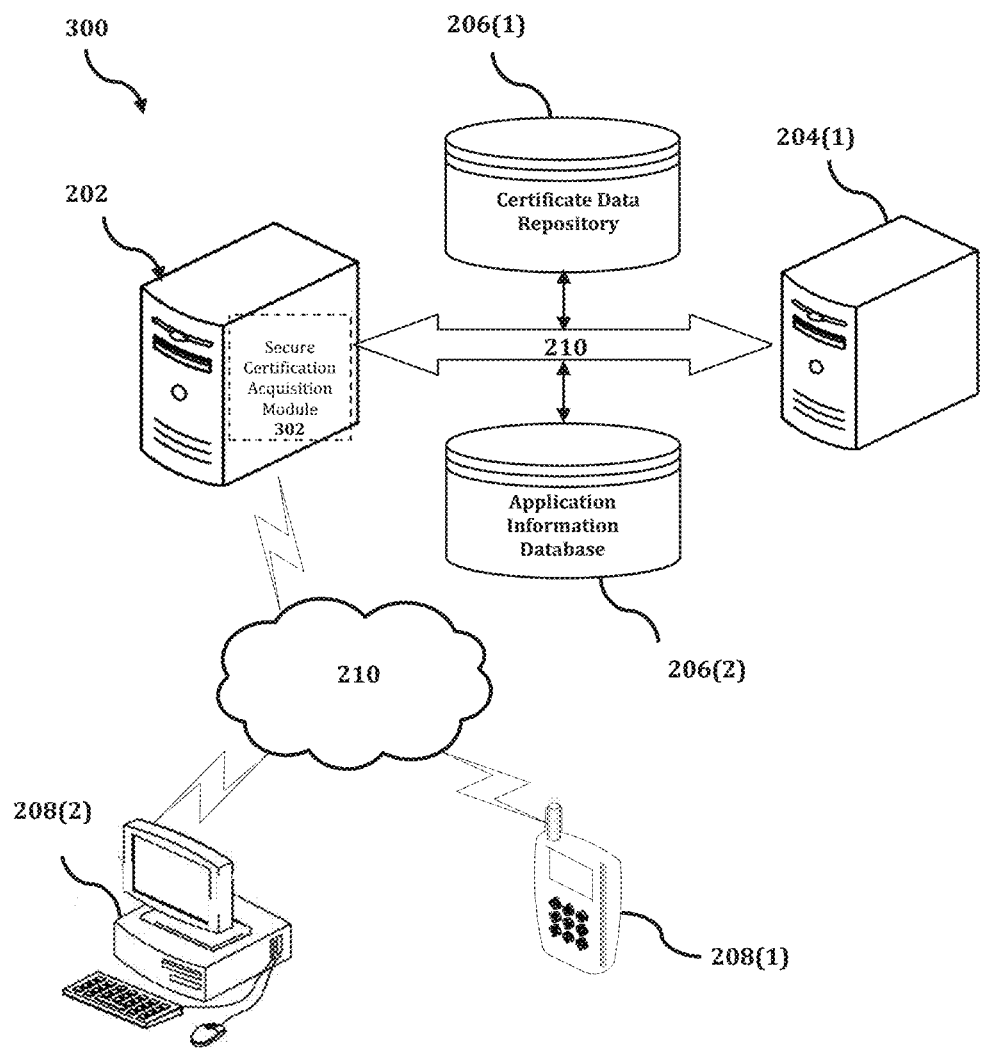
FIG. 3 shows an exemplary system for implementing a method for providing a certificate that securely verifies an identification of an application in order to enable the application to obtain access to a protected resource without a need for the application to store a security credential such as a password.

The C2C device 202 is described and shown in FIG. 3 as including a secure certification acquisition module 302, although it may include other rules, policies, modules, databases, or applications, for example. As will be described below, the secure certification acquisition module 302 is configured to implement a method for providing a certificate that securely verifies an identification of an application in order to enable the application to obtain access to a protected resource in an automated, efficient, scalable, and reliable manner.

An exemplary process 300 for implementing a method for providing a certificate that securely verifies an identification of an application in order to enable the application to obtain access to a protected resource without a need for the application to store a security credential such as a password by utilizing the network environment of FIG. 2 is shown as being executed in FIG. 3. Specifically, a first client device 208(1) and a second client device 208(2) are illustrated as being in communication with C2C device 202. In this regard, the first client device 208(1) and the second client device 208(2) may be "clients" of the C2C device 202 and are described herein as such. Nevertheless, it is to be known and understood that the first client device 208(1) and/or the second client device 208(2) need not necessarily be "clients" of the C2C device 202, or any entity described in association therewith herein. Any additional or alternative relationship may exist between either or both of the first client device 208(1) and the second client device 208(2) and the C2C device 202, or no relationship may exist.

Further, C2C device 202 is illustrated as being able to access a certificate data repository 206(1) and an application information database 206(2). The secure certification acquisition module 302 may be configured to access these databases for implementing a method for providing a certificate that securely verifies an identification of an application in order to enable the application to obtain access to a protected resource without a need for the application to store a security credential such as a password.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the C2C device 202 via broadband or cellular communication. Of course, these embodiments are merely exemplary and are not limiting or exhaustive.

Upon being started, the secure certification acquisition module 302 executes a process to generate a public key/private key pair.

This key pair will be used to digitally sign the identity assertions made by the secure certification acquisition module 302 to securely verify an identification of an application in order to enable the application to obtain access to a protected resource without a need for the application to store a security credential such as a password. An exemplary process for providing a certificate that securely verifies an identification of an application in order to enable the application to obtain access to a protected resource is generally indicated at flowchart 400 in FIG. 4.

Figure 4:
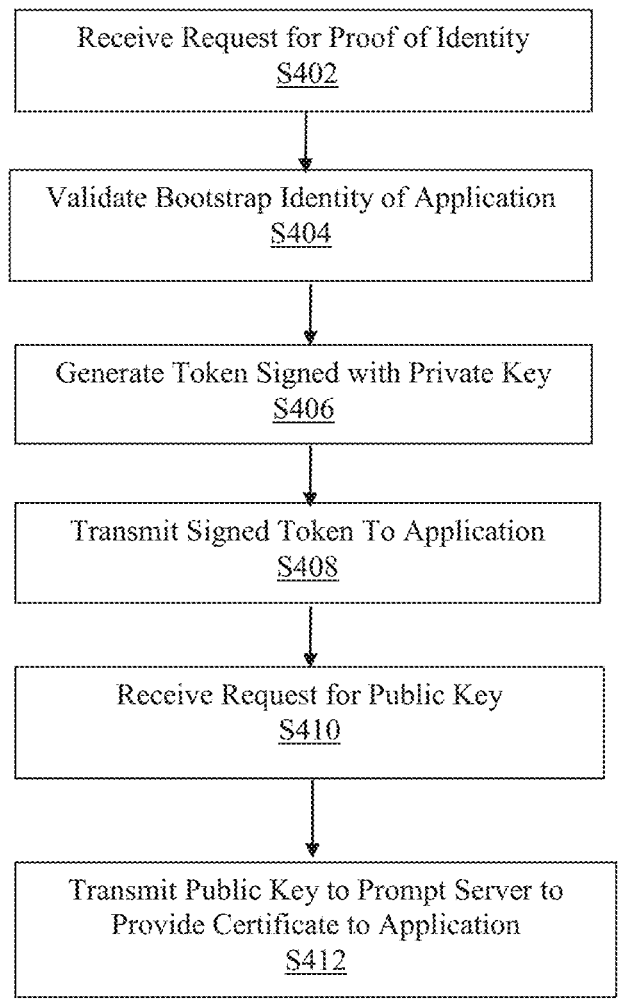
FIG. 4 is a flowchart of an exemplary process for implementing a method for providing a certificate that securely verifies an identification of an application in order to enable the application to obtain access to a protected resource without a need for the application to store a security credential such as a password.

In the process 400 of FIG. 4, at step S402, the secure certification acquisition module 302 receives, from an application, a request for an identity proof in a target directory. In an exemplary embodiment, the external directory is a Microsoft Active Directory that is interfaced to via Microsoft Active Directory Federation Services (ADFS). The request includes proof of a bootstrap identity that is provided by the platform of the application that has submitted the request.

In step S404, the secure certification acquisition module 302 verifies the bootstrap identity proof that was provided by the application. Then, in step S406, the secure certification acquisition module 302 generates a first token that is signed with the private key generated by the secure certification acquisition module 302. In an exemplary embodiment, the signed first token uses a JavaScript Object Notation (JSON) Web Token (JWT) format.

In step S408, the secure certification acquisition module 302 transmits the signed first token to the application. In an exemplary embodiment, the application receives the signed first token, but the first private key used to sign the token is not shared with the application. In this aspect, the fact that there is no need for the application to store a credential, such as a private key or a password, provides additional security and reduces control and management problems that may otherwise arise as a result of sharing and/or storing such sensitive information.

When the application receives the signed first token, the application then transmits the signed first token to the external server with a request for access to a target resource, such as, for example, a service or an application.

In order for the external server to verify the received JWT, it will look up the public key that pairs with the private key that was used to sign the JWT. In this manner, the transmission of the signed first token effectively prompts the external server to request a public key over an encrypted connection, such as, for example, TLS over HTTP, to an address that is pre-registered and known to the external server. This public key is usable for verifying the signature of the signed first token. Thus, at step S410, the secure certification acquisition module 302 receives a request for the public key from the external server.

At step S412, the secure certification acquisition module responds to the request by transmitting the public key to the external server. This external sever may cache this key for efficiency and only re-fetch the public key if the external server sees that a new key has been used to sign an incoming JWT.

Once the external server has the public key (or keys) from the secure certification acquisition module, the external server is then able to cryptographically validate the first JWT token that has been presented to it Once this verification has occurred, if successful, the external server will review entitlement of the asserted identity to the requested target resource, for example, via a group membership. If entitled, then the external server will issue a second token (e.g., a JWT) that would be trusted by the target resource.

The signed second token may also use the JWT format. In an exemplary embodiment, the second private key is also not shared with the application. The signed second key would then be returned to the requesting application.

The application is now able to use the signed second token to submit a request to a protected resource. In an exemplary embodiment, when such a request is submitted, a server that controls access to the protected resource obtains the public key from the external server and uses the public key to verify the signature of the signed second token. When this verification is completed, the server responds to the request for access to the protected resource.

Figure 5:
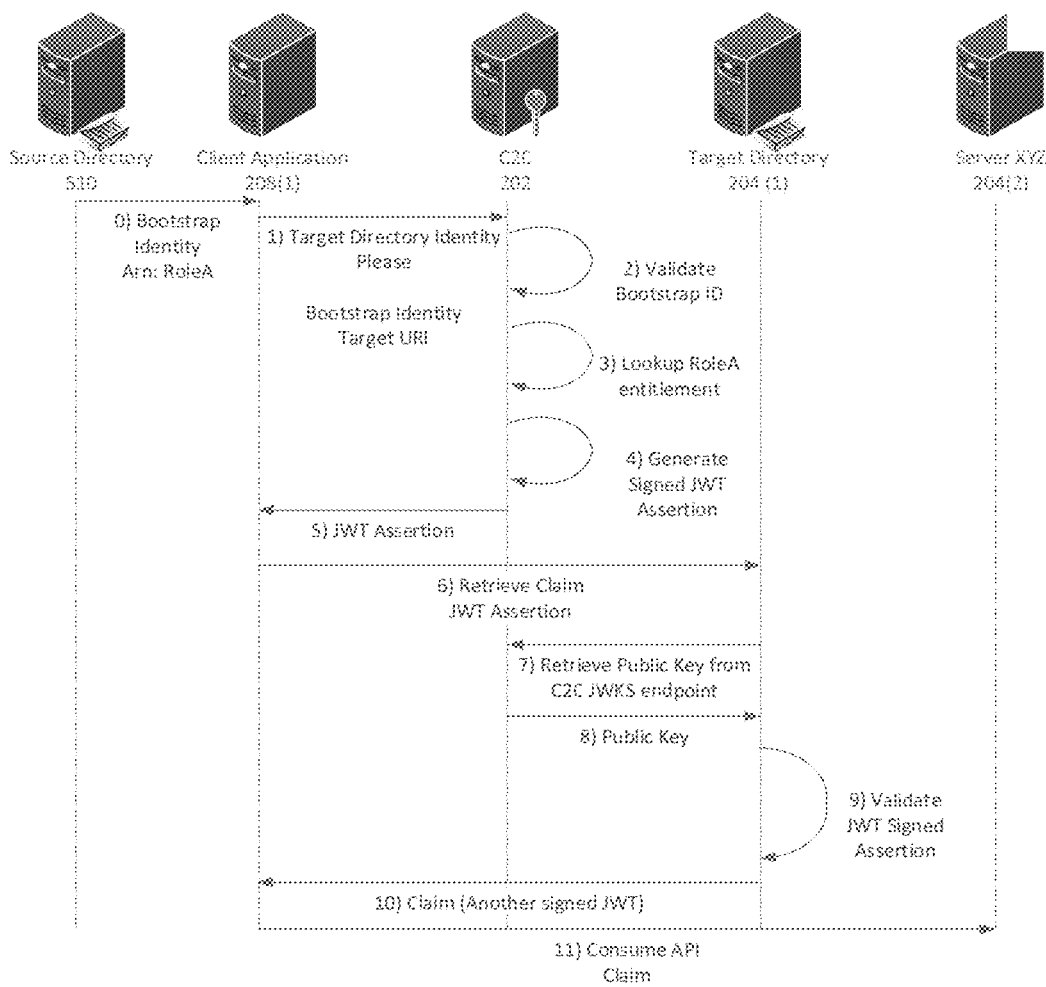
FIG. 5 is a data flow diagram that illustrates a sequence of data flows during an execution of a method for providing a certificate that securely verifies an identification of an application in order to enable the application to obtain access to a protected resource, in accordance with an exemplary embodiment.

Referring to FIG. 5, a data flow diagram 500 illustrates a sequence of data flows during an execution of a method for providing a certificate that securely verifies an identification of an application in order to enable the application to obtain access to a protected resource, in accordance with an exemplary embodiment.

At data flow #1, a client application 208(1) has received a bootstrap identity from a source directory 510, and the client application 208(1) forward the bootstrap identity to C2C device 202 in conjunction with a request for a target directory identity. At data flow #2, the C2C device 202 validates the bootstrap identity in order to determine a target directory uniform resource identifier (URI).

At data flow #3, the C2C device 202 determines whether the client application 208(1) is authorized to receive a signed JWT assertion, which is a token that is signed with a private key and uses a JSON Web Token format. At data flow #4, the C2C device 202 generates the signed JWT assertion, and then, at data flow #5, the C2C device 202 sends the signed JWT assertion to the client application 208(1).

At data flow #6, the client application 208(1) transmits the signed JWT assertion to the target directory, which is located at external server 204(1). Then, at data flow #7, the external server 204(1) transmits a request for a public key to the C2C device 202. In response, the C2C device 202 provides the public key to the external server 204(1) at data flow #8.

At data flow #9, the external server 204(1) uses the public key to validate the signed JWT assertion. In this aspect, the external server 204(1) uses the public key to verify the signature of the signed token. Once the validation is complete, the external server 204(1) generates a new JWT assertion that is signed by using another private key, and at data flow #10, the new signed JWT assertion is provided to the client application 208(1).

In this manner, the client application 208(1) has received the desired certificate, in the form of a signed JWT assertion. At data flow #11, the client application sends a request for access to a protected resource to another external server 204(2), and the certificate, with the newly generated JWT assertion, is included with the request so that the external server 204(1) is able to verify that the client application 208(1) should be granted the requested access.

Figure 6:
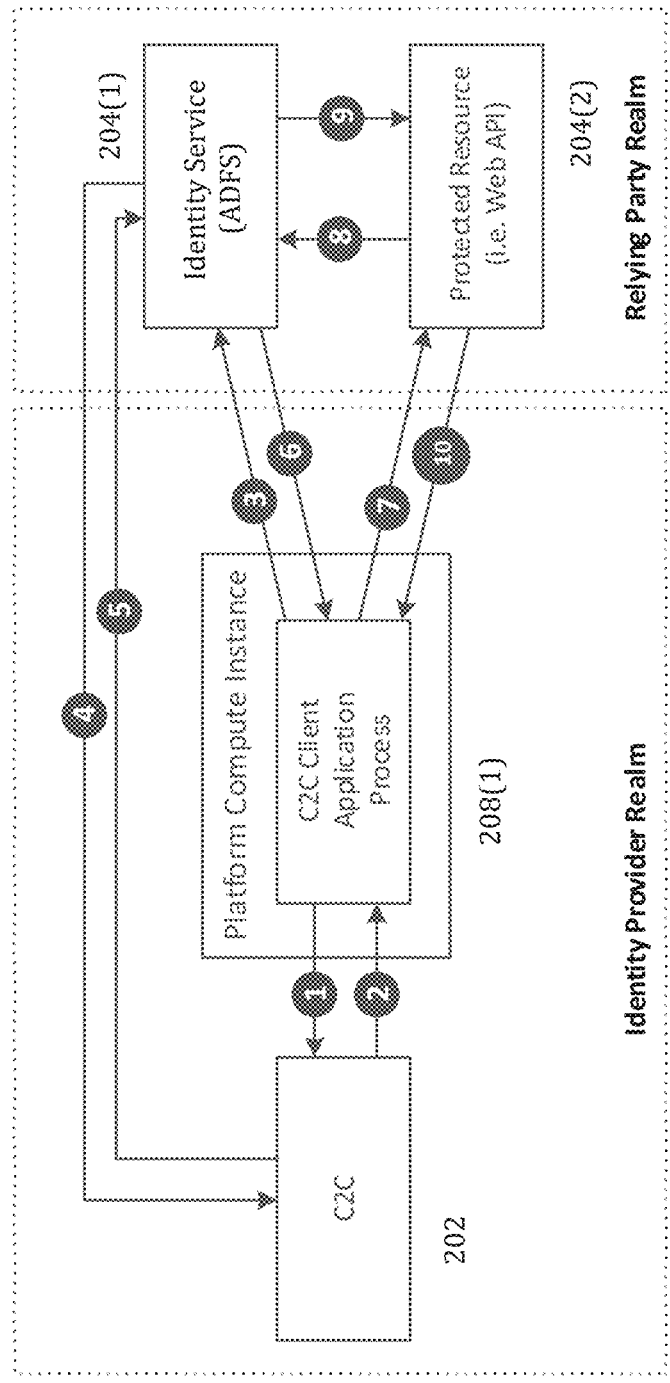
FIG. 6 is a block diagram that illustrates an identity exchange pattern that corresponds to a method for providing a certificate that securely verifies an identification of an application in order to enable the application to obtain access to a protected resource, in accordance with an exemplary embodiment.

Referring to FIG. 6, a block diagram 600 illustrates an identity exchange pattern that corresponds to a method for providing a certificate that securely verifies an identification of an application in order to enable the application to obtain access to a protected resource, in accordance with an exemplary embodiment.

As illustrated in FIG. 6, the C2C device 202 and the client application 208(1) reside within an identity provider realm, and external servers 204(1) and 204(2) reside within a relying party realm. In operation 1, the client application 208(1) provides its bootstrap identity to the C2C device 202, and in response, in operation 2, the C2C device 2020 verifies the bootstrap identity and issues a first token that has been signed by a first private key.

In operation 3, the client application 208(1) sends the signed first token to external server 204(1), which is an ADFS server. In operation 4, ADFS asks the C2C device 202 for a public key to be used for verification of the signature included with the signed first token, and in response, in operation 5, the C2C device 202 sends the public key to ADFS.

In operation 6, after verifying the signature, ADFS retrieves information that relates to the identity of the client application and then generates a second token together with a set of claims that tie the second token to an account that is associated with the owner of the client application. The second token is signed by using a second private key, and functions as a token that is usable for verifying the identity and entitlement of the client application.

In operation 7, the client application 208(1) sends a request for access to a protected resource to another external server that controls such access. The protected resource is associated with a web application programming interface (web API). In operation 8, the web API requests the public key from ADFS, and in operation 9, ADFS sends the public key to the web API. Lastly, in operation 10, the web API uses the public key to verify the signature of the signed second token, and once the verification is complete, the web API responds to the access request.

Accordingly, with this technology, an optimized process for implementing methods and systems for providing an identity assertion that enables an application to obtain access to a protected resource without a need for the application to store a security credential such as a password is provided, and to leverage a platform identity of which the target application has no knowledge or trust. In this manner, these methods and systems effectively act as a broker between identity platforms.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating a provision of a certificate that securely verifies an identification of an application, the method being implemented by at least one processor, the method comprising:
   receiving, from the application, a request for an identity of a target directory that relates to an external server, the request including a bootstrap identity that is provided by a platform of the application and identifies both the platform and the application at a time of invocation;
   validating the bootstrap identity that is provided by the platform of the application;
   generating a first private key based on the validated bootstrap identity;
   generating a first token that is signed with the first private key and transmitting the signed first token to the application without transmitting the first private key used to generate the first token, such that the application is restricted from access to the first private key;
   receiving, from the external server after the signed first token has been received by the external server from the application, a request for a public key to be used for verifying the first private key; and
   transmitting, to the external server, the requested public key based on the signed first token and in order to prompt the external server to provide the certificate to the application,
   wherein when prompted to provide the certificate to the application, the external server is configured to generate a second token that is signed with a second private key and to transmit the certificate in conjunction with the signed second token to the application, and
   wherein the application accesses a protected resource with the second token.

2. The method of claim 1, wherein each of the first private key and the second private key is never provided to the application.

3. The method of claim 1, wherein at least one from among the signed first token and the signed second token uses a JavaScript Object Notation (JSON) Web Token (JWT) format.

4. The method of claim 1, wherein the external server is an Active Directory Federation Services (ADFS) server.

5. A method for obtaining a certificate that securely verifies an identification of an application, the method being implemented by at least one processor configured to execute the application, the method comprising:
   transmitting, by the at least one processor to a first server, a request for an identity of a target directory that relates to an second server configured to generate the certificate, the request including a bootstrap identity that is provided by a platform and identifies both the platform and the application at a time of invocation;
   generating a first private key based on the bootstrap identity;
   receiving, by the at least one processor from the first server, a first token that is signed with the first private key without transmitting the first private key used to generate the first token, such that the application is restricted from access to the first private key;
   transmitting, by the at least one processor to the second server, the signed first token; and
   receiving the certificate from the second server after the second server has obtained a public key from the first server and used the public key to verify the signed first token, and receiving, in conjunction with the certificate, a second token that is generated by the second server and signed with a second private key, wherein the application accesses a protected resource with the second token.

6. The method of claim 5, further comprising:
   transmitting, by the at least one processor to a third server configured to control access to a resource, a request that relates to the resource, the request including the certificate and the signed second token; and
   receiving a response to the request from the third server.

7. The method of claim 6, wherein the receiving of the response to the request occurs after the third server has obtained the public key from the second server and used the public key to verify the signed second token.

8. The method of claim 6, wherein each of the first private key and the second private key is never provided to the at least one processor.

9. The method of claim 6, wherein at least one from among the signed first token and the signed second token uses a JavaScript Object Notation (JSON) Web Token (JWT) format.

10. The method of claim 6, wherein the second server is an Active Directory Federation Services (ADFS) server.

11. The method of claim 6, wherein the third server includes a web application programming interface (API).

12. A computing apparatus for facilitating a provision of a certificate that securely verifies an identification of an application, the computing apparatus comprising:
   a processor;
   a memory; and
   a communication interface coupled to each of the processor and the memory,
   wherein the processor is configured to:
      receive, from the application via the communication interface, a request for an identity of a target directory that relates to an external server, the request including a bootstrap identity that is provided by a platform of the application and identifies both the platform and the application at a time of invocation;
      validate the bootstrap identity that is provided by the platform of the application;
      generate a first private key based on the validated bootstrap identity;
      generate a first token that is signed with the first private key and transmit the signed first token to the application via the communication interface without transmitting the first private key used to generate the first token, such that the application is restricted from accessing the first private key;
      receive, from the external server via the communication interface after the signed first token has been received by the external server from the application, a request for a public key to be used for verifying the first private key; and
      transmit, to the external server via the communication interface, the requested public key based on the signed first token and in order to prompt the external server to provide the certificate to the application, wherein when prompted to provide the certificate to the application, the external server is configured to generate a second token that is signed with a second private key and to transmit the certificate in conjunction with the signed second token to the application, and wherein the application accesses a protected resource with the second token.

13. The computing apparatus of claim 12, wherein each of the first private key and the second private key is never provided to the application.

14. The computing apparatus of claim 12, wherein at least one from among the signed first token and the signed second token uses a JavaScript Object Notation (JSON) Web Token (JWT) format.

15. The computing apparatus of claim 12, wherein the external server is an Active Directory Federation Services (ADFS) server.

* * * * *